United States Patent [19]
Baba et al.

[11] 3,811,056
[45] May 14, 1974

[54] VELOCITY SENSOR

[75] Inventors: Kosaku Baba, Yokohama; Kiyoshi Wazawa, Fujisawa, both of Japan

[73] Assignee: Nissan Motor Company, Limited, Yokohama, Japan

[22] Filed: Oct. 3, 1972

[21] Appl. No.: 294,584

[30] Foreign Application Priority Data
Dec. 6, 1971  Japan............................. 46-113945

[52] U.S. Cl..................... 307/311, 324/160, 328/2, 250/231 SE
[51] Int. Cl.............................................. H03k 3/42
[58] Field of Search .......... 307/311, 260, 265, 268, 307/271, 278; 328/1, 2; 324/160, 176

[56] References Cited
UNITED STATES PATENTS

| | | | |
|---|---|---|---|
| 3,534,351 | 10/1970 | Harnden | 307/311 |
| 3,418,479 | 12/1968 | Schmitt | 307/311 |
| 3,421,488 | 1/1969 | Tarter | 307/311 |
| 3,688,302 | 8/1972 | Lampkin | 307/311 |
| 2,971,134 | 2/1961 | Cockrell | 307/311 |
| 3,684,898 | 8/1972 | Wood | 307/311 |
| 3,622,801 | 11/1971 | Stone | 307/311 |
| 3,654,479 | 4/1972 | Catherin | 307/311 |
| 3,576,452 | 4/1971 | Smith | 307/311 |
| 3,281,634 | 10/1966 | Studer | 307/311 |
| 3,096,444 | 7/1963 | Seward | 307/311 |

FOREIGN PATENTS OR APPLICATIONS

| | | | |
|---|---|---|---|
| 112,367 | 10/1964 | Czechoslovakia | 307/311 |
| 1,447,400 | 6/1965 | France | 307/311 |
| 1,276,001 | 8/1968 | Germany | 307/311 |

OTHER PUBLICATIONS

Brownback, "DC Motor Speed Control," IBM Tech. Disc. Bull., Vol. 13, No. 1, June 1970, Page 77.

Primary Examiner—Rudolph V. Rolinec
Assistant Examiner—Ro E. Hart

[57] ABSTRACT

A sensor for measuring the revolution speed of a rotary element which may be a wheel axle of a motor vehicle. The sensor has a rotary disc which is positioned between light-emissive and light-sensitive means which are aligned with each other. The rotary disc has a number of apertures at its entire periphery, which apertures are successively brought into alignment with the flux of the light projected from the light-emissive means to the light-sensitive means as the disc is driven for rotation in synchronism with the rotary element to be measured. The light-sensitive means thus produces a train of pulses having a frequency related to the revolution speed of the rotary disc. The pulses are fed to an electric circuit arrangement for being shaped and amplified and delivered to a system to be controlled on the thus produced output signals. The circuit arrangement includes means which is adapted to compensate for errors which would otherwise be involved in the output signals where the sensor is subject to variation in the ambient temperature.

13 Claims, 4 Drawing Figures

VELOCITY SENSOR

The present invention relates to velocity sensors and, more particularly, to a velocity sensor of the character which is adapted to produce an electric signal which is indicative of a revolution speed of a rotary element. While the velocity sensor herein proposed will find various practical applications in the industry, it is especially advantageous for the measurement of the driving speed of a motor vehicle, producing an electric signal which is proportional to the vehicle speed or to the speed of rotation of the wheel axle of the motor vehicle. The velocity sensor according to the present invention will therefore be described as being installed on the motor vehicle. It should, however, be borne in mind that such is merely by way of example and, as such, the velocity sensor herein disclosed is compatible with any other equipment in which rotary motions are involved.

To provide enhanced safety, reliability and ease of driving of the motor vehicles, research and development are under way in quest of various electric control devices for use, for instance, in anti-skid systems, electrically controlled power transmission systems, fuel injection systems and automatic speed control systems. All these systems operate on signals representing the speed of the motor vehicle and, for the purpose that the systems be controlled with sufficient accuracy, it is of paramount importance that the signals be responsive to the vehicle speed faithfully throughout the whole range of the speed. The prior art velocity sensors usually eddy-current dynamometers or magnetic induction tachometer-generators, wherein drawbacks are encountered in that the energy of the output signal diminishes critically as the vehicle speed approaches the zero level and consequently fails to control the associated working systems with required accuracy. To remedy this difficulty, the tachometer-generators of the improved versions use increased numbers of pole pieces so as to raise the level of the energy of the signals produced, still failing to provide satisfactory signal levels at vehicle speeds approximating zero. The purpose of precisely measuring the speeds in the neighbourhood of zero may be achieved through utilization of the stroboscopic speed meters which have thus far been used on various measuring instruments. The measuring devices of this nature are, however, still unacceptable as the automotive velocity sensors because of their considerably large-sized constructions that are incompatible with the limited working spaces in the motor vehicles and by reason of the risks of failure that are involved by lights forming part of the devices.

Apart from this, the velocity sensors for the motor vehicles are usually positioned in association with power transmission extensions which are subject to change in temperature during operation. The temperatures around the power transmission extensions vary from $-30°$ to $100°$ C and, thus, the signals supplied by the velocity sensors are more or less influenced by such variation in the temperature. To maintain the reliability and performance quality of the velocity sensors, therefore, it is highly preferable that the errors resulting from the temperature variation be compensated before the signals are delivered from the sensors.

It is, therefore, an important object of the present invention to provide an improved velocity sensor which is accurately responsive to the speed of rotation of a rotary element.

It is another important object of the invention to provide an improved velocity sensor which is capable of producing a signal which is precisely representative of the speed of rotation of a rotary element even though the speed of rotation is in the neighbourhood of zero.

It is still another important object of the present invention to provide an improved velocity sensor having a compact and small-sized construction which is ready to be incorporated in a limited working space and which is economical to manufacture.

It is still another important object of the invention to provide an improved velocity sensor featuring enhanced reliability and prolonged service life and adapted for use under severe operating conditions.

It is still another important object of the present invention to provide an improved velocity sensor which is capable of producing velocity-bearing signals which are sufficiently accurate irrespective of the variation in the temperature surrounding the sensor.

Yet, it is another important object of the invention to provide an improved velocity sensor for use with various types of control systems of motor vehicles.

These and other objects of the present invention are accomplished basically in a velocity sensor which comprises a source of light, light-sensitive means positioned at a spacing from the source of light for producing an electric signal in response to illumination with the light therefrom, a rotary disc having a multiplicity of apertured at its perimeter and positioned between the light source and the light-sensitive means, the rotary disc being driven for rotation at a velocity which is substantially proportional to the speed of rotation to be measured and thus delivering electric pulses representative of the velocity detected, and compensatory means for compensating errors which are involved if any in the pulses as a result of the variation in the temperature surrounding the sensor.

The features and advantages of the velocity sensor according to the present invention will become more apparent from the following description taken in conjunction with the accompanying drawing, in which.

Figure 1:
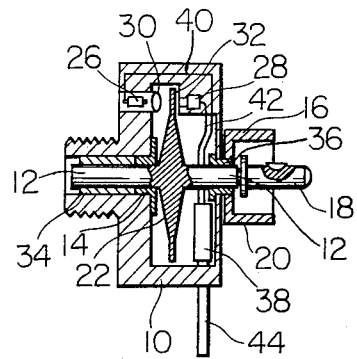
FIG. 1 is a cross sectional view showing a preferred embodiment of the vehicle sensor according to the present invention.

Referring now to the drawing, first to FIG. 1, the velocity sensor according to the present invention includes a casing 10 on which a rotary shaft 12 is journalled through bearings 14 and 16. The casing 10 is usually formed of an aluminium casting and is positioned stationary relative to an equipment having a rotary element (not shown) the revolution speed of which is to be measured. The rotary shaft 12 is thus connected to and driven by this rotary element through an intermediate shaft 18. Where the velocity sensor is used specifically on a motor vehicle as previously noted, the casing 10 is usually mounted on a transmission speed-meter cable outlet structure (not shown) through a box unit 20. In this instance, the intermediate shaft 18 is connected to a drive shaft (not shown) of the transmission speed-meter cable.

Figure 2:
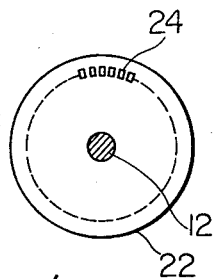
FIG. 2 is a plan view of an apertured rotary disc forming part of the velocity sensor shown in FIG. 1.

The rotary shaft 12 carries thereon a rotary disc 22 which is rotatable with the shaft 12 within the casing 10. As better seen in FIG. 2, this rotary disc 22 has a number of regularly spaced apertures 24 formed at its perimeter. For the measurement of the vehicle speed, it is preferable that 60 or 120 apertures, each measuring 0.2 mm by 1.2 mm, be formed in the rotary disc of 0.2 mm thickness by a photo-etching process. A suitable form of light source 26 and suitable light-sensitive means 28 are carried on the casing 10 and positioned on both sides of the rotary disc 22 and in alignment with the apertures 24 in the disc 22, as seen in FIG. 1. The light-sensitive means 28 is adapted to produce an electric signal irradiated from the light source 26 through the apertures 24 in the rotary disc 22. The light-sensitive means may thus be a photo-transistor or a suitable photoelectric semiconductor such as for example a solar cell. The light source 26, on the other hand, may be a usual tungsten-filament light or a suitable light-emissive diode.

To direct the light from the source 26 on to the apertures 24 in the form of parallel rays, a light-condensing lens 30 may preferably be positioned between one face of the rotary disc 22 and the light source 26 and in alignment with the apertures 24 and the light-sensitive means 28. To provide a clearcut flux of the light to be incident on the light-sensitive means 28, a stop 32 may be positioned between the opposite face of the rotary disc 22 and the light-sensitive means 28 for limiting the effective sectional area of the flux of the light passed thereto from the condensing lens 30 through the apertures 24 in the disc 22. The source of light 26, condensing lens 30, optical stop 32 and light-sensitive means 28 are thus located substantially in line with each other and, thus, the apertures 24 in the rotary disc 22 are successively brought into alignment therewith as the rotary disc 22 is driven for rotation.

Designated by reference numerals 34 and 36 in FIG. 1 are an oil seal and an O-ring, respectively, which are interposed between the casing 10 and the rotary shaft 12 to prevent ingress of oil or moisture into the chamber in the casing 10. Although the rotary shaft 12 is herein illustrated as being integral with the rotary disc 22, the rotary disc may be built as an independent member which is mounted on the shaft 12 with use of suitable fastening means.

The casing 10 further accommodates therein an electric circuit arrangement 38 which is connected to the source of light 26 and light-sensitive means 28 through lines 40 and 42, respectively. This electric circuit arrangement 38 is adapted to shape and amplify the pulses supplied from the light-sensitive means 28 and to compensate the errors which may be involved in the signals to be delivered therefrom by reason of the variation in the temperature surrounding the velocity sensor, as previously noted. The circuit arrangement 38 is preferably in the form of an integrated circuit or printed circuit unit which is ready to be incorporated into the casing 10. The output of this circuit arrangement 38 is connected through the lines 44 to the system or systems to be controlled in accordance with the revolution speed detected and measured by the velocity sensor. Though not shown in FIG. 1, the lines 44 are assumed to include lines through which the source of light 26 and the electric circuit arrangement 38 are powered.

When, in operation, the rotary shaft 12 and accordingly the rotary disc 22 are driven through the intermediate shaft 18 from the driving source such as the transmission speed-meter cable of the motor vehicle, the apertures 24 in the disc 22 successively cut across the flux of light emerging from the light source 26 through the condensing lens 30 in the form of parallel rays. The light incident on the light-sensitive means 28 such as the solar cell is consequently interrupted or intermittently "flashes" as the rotary disc 22 rotates with the shaft 12. The frequency of interruption of the light incident on the light-sensitive means 28 is substantially proportional to the speed of rotation of the rotary disc 22 and accordingly to the driving speed of the motor vehicle (if the velocity sensor is used on the motor vehicle). The light-sensitive means 28 thus produces a pulse train having a frequency which is related to the speed of rotation of the rotary disc 22. Provision of the stop 32 will lend itself to formation of steeply rising and falling impulses and consequently to improving the response of the output signals to the input.

The pulses thus representative of the speed of rotation of the rotary disc 22 are then supplied to the electric circuit arrangement 38. A preferred example of this circuit arrangement 38 will now be described wherein the light-sensitive means 28 to be associated with the circuit arrangement is exemplified in a solar cell which in itself is well known in the art. In the absence of irradiation on the solar cell, the solar cell exhibits the voltage-current characteristics which are indicated by a curve $a$ in FIG. 3. When radiated with the light, the solar cell now displays voltage-current characteristics which are demonstrated by a curve $b$ so that the point of actuation of the cell is shifted from point A to point B in FIG. 3. A voltage $V_r$ is consequently built up between the electrodes of the cell so that a current $I_r$ flows through the cell. When the light incident on the solar cell is intercepted by the rotary disc 22 (FIG. 1), then the point of actuation is relocated from point B to point A and accordingly the voltage $V_r$ and current $I_r$ disappear.

Figure 4:
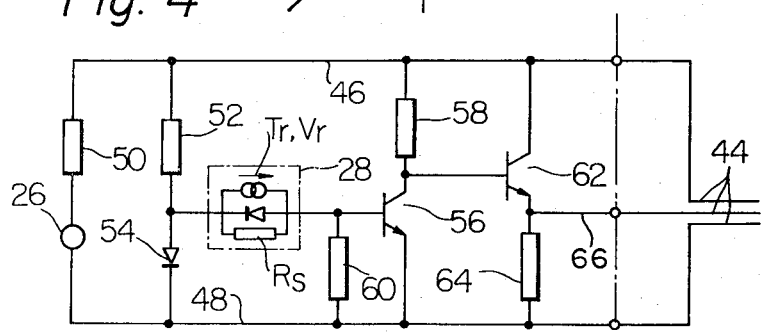
FIG. 4 is a schematic circuit diagram showing a preferred circuit arrangement which forms part of the velocity sensor according to the present invention.

A practical example of the electric circuit arrangement compatible with the solar cell having these characteristics is illustrated in FIG. 4. Referring to FIG. 4, the circuit arrangement includes a positive bus line 46 connected to a power source (not shown) and a negative bus line 48 which is grounded. The light source 26 is connected between the bus lines 46 and 48 through a resistor 50 to protect the light source 26. A resistor 52 and a diode 54 are serially connected between the bus lines 46 and 48, the diode 54 having a cathode terminal connected to the negative bus line 48. The resistor 52 and the anode terminal of the diode 54 are connected to one electrode of the solar cell 28 which is herein indicated in the form of an equivalent circuit. The other electrode of the solar cell 28 is connected to a base electrode of a transistor 56 which has a collector electrode connected to the positive bus line 46 through a resistor 58 and an emitter electrode connected to the negative bus line 48. A thermistor 60 has one terminal connected to a junction between the solar cell 28 and the base electrode of the transistor 56 and the other terminal connected to the negative bus line 48. The collector electrode of the transistor 56 is further connected to a base electrode of another transistor 62. This second transistor 62 has a collector electrode connected to the positive bus line 46 and an emitter electrode connected to the negative bus line 48 through a resistor 64, thereby forming an emitter follower circuit. The emitter electrode of the transistor 62 is also connected to a line 66 for delivering an output signal. The resistor 64 should be selected in a manner to provide an impedance to match the imput impedance of the system to be controlled by the velocity sensor. The diode 54, furthermore should be so selected as to bias the potential on the base electrode of the transistor 56 to a cut-off voltage of the transistor, say, to the order of 0.6 volt whereby the current from the solar cell can be efficiently utilized.

When, now, the solar cell 28 is irradiated with the light from the source of light 26 and accordingly the current $I_r$ flows therefrom as previously discussed, then the transistor 56 is readily saturated in the presence of the bias current with the result that a ground potential of a logical "0" value appears on the collector electrode of the transistor 56. When the light incident on the solar cell 28 is intercepted by the rotating disc 22 (FIG. 1) as previously noted, then the solar cell 28 ceases supply of the current so that the transistor 56 is cut off and accordingly the potential on the collector electrode of the transistor is stepped up to a higher level of a logical "1" value. The output voltage on the collector electrode of the transistor 56 is then converted into a low-impedance output by means of the emitter follower circuit consisting of the transistor 62 and the resistor 64. The low-impedance output is fed to the line 66 in the form of a pulse train having a predetermined amplitude as the rotary disc 22 (FIG. 1) rotates in synchronism with the rotation of the rotary element to be measured.

Where the velocity sensor having the above described construction is incorporated in a motor vehicle, the sensor unit is mounted on the transmission extension of the motor vehicle, as previously mentioned. The temperature surrounding the transmission extension is subject to variation in a relatively broad range of, for instance, from $-30°$ to $100°$ C and, as a consequence, the performance characteristics of the solar cell 28 and the transistor 56 would more or less change so that the resultant signals would involve errors unless suitable means is provided to compensate such errors.

Figure 3:
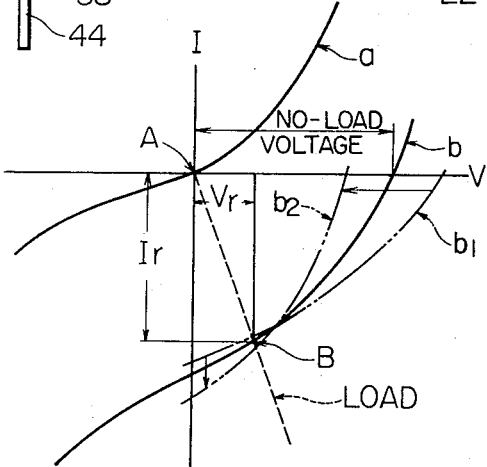
FIG. 3 is a graph indicating dark and light-responsive characteristics curves of a photoelectric element used in the velocity sensor shown in FIG. 1.

The voltage-current characteristics of the solar cell vary with the ambient temperature as indicated in FIG. 3, viz., from curve $B_1$ to curve $B_2$ as the ambient temperature increases. When, thus, the solar cell is subjected to a relatively high temperature, the no-load voltage steeply decreases but the short-circuit current increases only appreciably. In the circuit arrangement shown in FIG. 4, the forward voltage across the diode 54 and the forward voltage across the base-emitter junction of the transistor 56 are substantially on an equal level so that the load on the solar cell 28 approximates a zero level as indicated by point B. Thus, a load current approximating the short-circuit current flows through the solar cell 28 so that the change of the point of actuation of the solar cell can be sufficiently constrained. In the absence of the light incident on the solar cell, the internal resistance $R_s$ (FIG. 1) will now come into play. This internal resistance $R_s$ of the solar cell 28 decreases in a exponential fashion as the ambient temperature rises with the resultant change in the point of actuation of the solar cell 28 which is isolated from the illumination from the light source 26. This change in the point of actuation of the solar cell 28 is compensated for by the action of the thermistor 60 which is incorporated in the circuit arrangement shown in FIG. 4.

The point of actuation of the transistor 56 also changes as a result of the variation in the ambient temperature. Such change in the point of actuation is compensated for by the action of the diode 54 having its anode and cathode terminals connected respectively to the base and emitter electrodes of the transistor 56.

It will now be appreciated from the foregoing description that the velocity sensor herein proposed has various outstanding advantages over the prior art counterparts and is thus well compatible with various sophisticated electric control systems such as the automotive control systems.

Because, for instance, the sizes of the individual optical and mechanical parts and elements may be reduced substantially as desired and because the electric circuit arrangement can be snugly incorporated into the total unit, the velocity sensor in its entirety can be constructed so simply and compactly as to reasonably meet the exacting space requirement that may be imposed on the velocity sensor as in the case of those to be incorporated in motor vehicles. Since, moreover, the rotary disc may be formed with any desired number of apertures by the photo-etching process and since a highly responsive photoelectric element can be utilized as the light-sensitive means, the velocity sensor according to the present invention is capable of delivering a sufficiently great number of pulses in a unit of time or for a single rotation of the rotary disc. Thus, not only the extremely low revolution speed can be measured with sufficient accuracy but the control system associated with the velocity sensor can respond to the governing operational variables sufficiently faithfully. Since, thus, the output signals from the velocity sensor are supplied in the form of the density of pulses, the relationships between the revolution speed to be detected and the number of the pulses produced may be standardized depending upon the types and applications of the control systems on which the velocity sensor according to the present invention is to be used. The pulses supplied from the light-sensitive means are shaped and amplified within the sensor unit and delivered as the output signals with low impedance, viz., with high signal-to-noise ratios, so that only one unit of the velocity sensor suffices to govern a number of control systems all at a time.

The errors which may be involved in the performance characteristics of the light-sensitive means and the transistor forming part of the emitter-grounded amplifier circuit of the circuit arrangement due to the variation in the temperature surrounding the sensor unit are compensated for by the use of a diode and a thermistor so that the velocity sensor is capable of operating reliably even though it is installed where the ambient temperature is subject to variation in a broad range as in the vicinity of the transmission extension of a motor vehicle.

Where, moreover, the velocity sensor is used on an equipment which is subjected to shocks and vibrations as in a motor vehicle, the source of light forming part of the sensor should be selected so as to sufficiently withstand such shocks and vibrations. If, thus, a tungsten-filament light is to be used as the source of light, a relatively short and thick filament for high-tension and large-current uses should be employed at a voltage lower than its rating.

Because the shaft carrying the rotary disc is journalled at its opposite ends on the casing, the velocity sensor can be readily fitted on the existing transmission speed-meter cable if the sensor is intended to be specifically incorporated in a motor vehicle. Where the revolution speeds of the speed-meter cables are prescribed by local industrial standards, the velocity sensor according to the present invention is compatible with the motor vehicles of any type and model provided the sensor is mounted on the transmission speed-meter cable to detect the vehicle speed.

What is claimed is:

1. A velocity sensor for measuring the speed of rotation of a rotating element, comprising:
   a source of light;
   light-sensitive means positioned at a spacing from and in alignment with said source of light for producing an electric output when irradiated with light from said source of light;
   a rotary disc having a multiplicity of substantially uniformly spaced apertures at its entire perimeter and rotatably positioned between said source of light and said light-sensitive means, said rotary disc being driven for rotation at a velocity which is substantially proportional to the speed of rotation of said rotary element, said apertures in the rotary disc being successively aligned with said source of light and said light-sensitive means as the rotary disc rotates for causing said light-sensitive means to produce electric pulses having a frequency determined by the frequency of interception of the light incident on the light-sensitive means;
   a light-condensing lens which is positioned between said source of light and said rotary disc and in alignment with said light-sensitive means;
   an optical stop which is positioned between said light-sensitive means and said rotary disc and in alignment with said source of light; and
   an electric circuit arrangement shaping and amplifying said pulses and compensating errors involved in said pulses as a result of variation in the temperature surrounding said sensor.

2. A velocity sensor as claimed in claim 1, in which said electric circuit arrangement comprises an emitter-grounded amplifying circuit connected to an output of said light-sensitive means and an emitter-follower circuit connected to said amplifying circuit and controlling an output impedance of said circuit arrangement.

3. A velocity sensor as claimed in claim 2, in which said emitter-grounded amplifying circuit comprises a transistor having a base electrode which is grounded, the collector electrode of the transistor being connected to a source of power through a resistor and to said emitter-follower circuit.

4. A velocity sensor as claimed in claim 3, in which said electric circuit arrangement further comprises a thermistor having one terminal connected between the output of said light-sensitive means and the base electrode of said transistor and the other terminal connected to ground.

5. A velocity sensor as claimed in claim 3, in which said electric circuit arrangement further comprises a diode having an anode terminal connected to the power source through an input of said light-sensitive means and a cathode terminal connected to ground.

6. A velocity sensor as claimed in claim 1, in which said source of light comprises a light-emissive diode.

7. A velocity sensor as claimed in claim 1, in which said source of light comprises a tungsten-filament light.

8. A velocity sensor as claimed in claim 1, in which said light-sensitive means comprises a photoelectric semiconductor element.

9. A velocity sensor as claimed in claim 8, in which said photoelectric semiconductor element is a solar cell.

10. A velocity sensor as claimed in claim 1, further comprising a stationary casing and a shaft carrying said rotary shaft and rotatably journalled on said casing, said shaft being driven for rotation with said rotary disc from said rotary element.

11. A velocity sensor as claimed in claim 10, further comprising coupling means for operatively connecting said shaft to said rotary element.

12. A velocity sensor as claimed in claim 1, in which each of said apertures measures 0.2 mm by 1.2 mm.

13. A velocity sensor as claimed in claim 1, in which said apertures are formed by a photo-etching process.

* * * * *